Dec. 4, 1934.  H. GODZIEWSKI  1,983,286
APPARATUS FOR COMPENSATING FOR PLAY IN
MACHINES FOR CUTTING SCREW THREADS
Filed Sept. 1, 1933
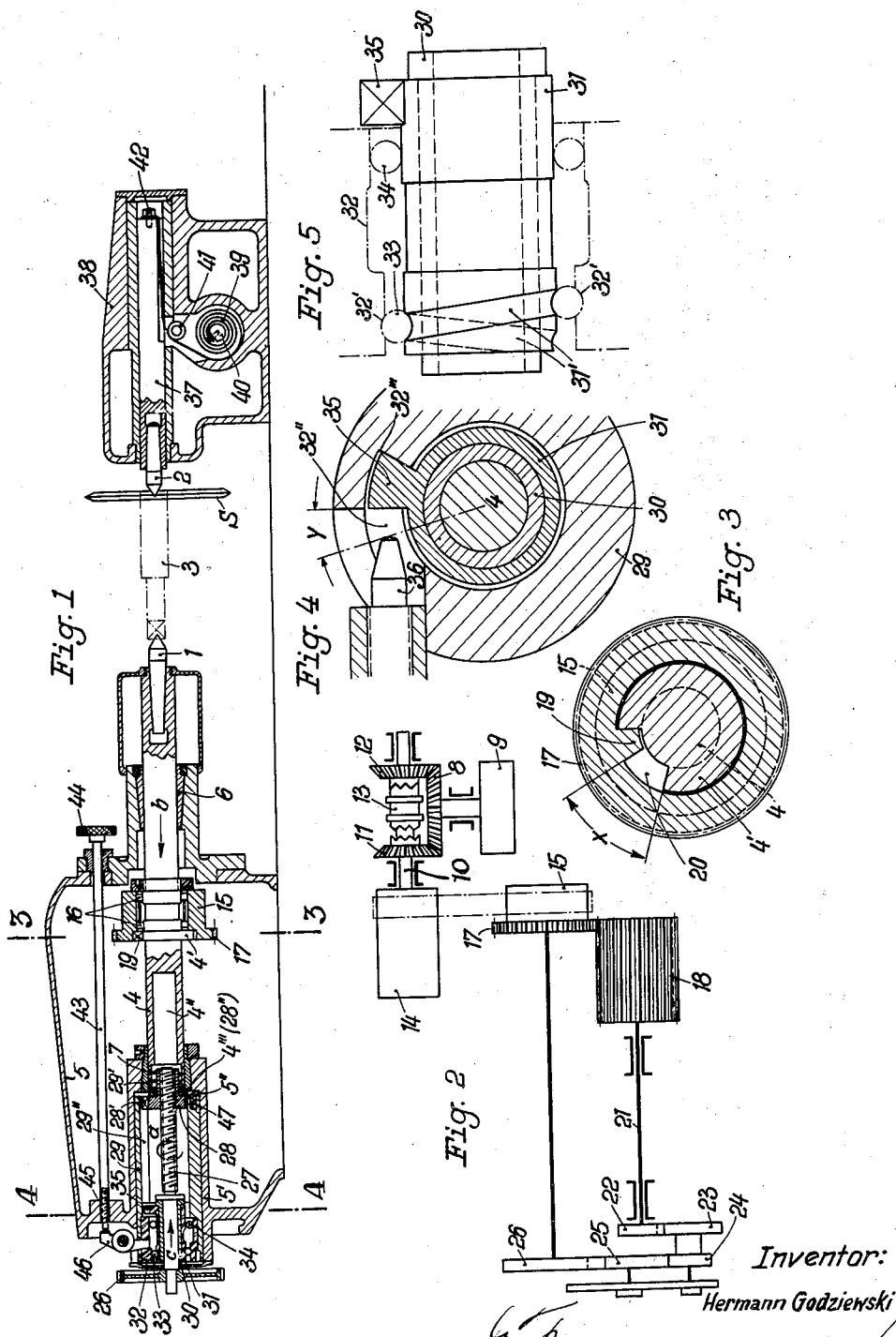
Inventor:
Hermann Godziewski Patented Dec. 4, 1934

1,983,286

UNITED STATES PATENT OFFICE 1,983,286

APPARATUS FOR COMPENSATING FOR PLAY IN MACHINES FOR CUTTING SCREW THREADS

Hermann Godziewski, Eichwalde, near Teltow, Germany

Application September 1, 1933, Serial No. 687,885
In Germany April 29, 1933

5 Claims. (Cl. 51—95)

It is known to compensate for the play in machines for cutting screw-threads, which operate during forward and backward feed, arising upon the return movement of the cooperating parts of the driving mechanism, in such a way that the work carrier is arranged to be movable within limits between adjustable stops of a driver member. Hereby the commencements of the rotary movement of the work is delayed always by the amount of the play prevailing. This device has the disadvantage that it can only be exactly adjusted when the machine is stationary.

According to the invention compensation for the play in machines for cutting screw threads, in particular machines in which the feed is brought about by a direct axial shifting of the work spindle by means of a co-axially arranged guide spindle, is effected in such a way, that upon reversal of the direction of operation the rotary movement of the work spindle is always delayed by the maximum value of the lost motion occurring within the working range of the machine, and that the feed of the work spindle, which commences after the existing lost motion has been overcome and occurring up to the commencement of the rotary movement, is rendered inoperative by an oppositely directed axial movement of the lead screw, of such duration that no alteration occurs in the relative axial location of the grinding tool and work. In addition the element for example a pulley wheel which transmits the rotary movement to the work spindle is mounted on the work spindle without being positively connected thereto and the rotary movement transmitted by a driver member, which engages in a segmental recess in the work spindle with a rotary play. This rotary play corresponds to the maximum play arising during the operation of the machine. Further according to the invention the lead screw is arranged in a friction bearing box which runs in one or more sets of ball bearings.

Of the said sets of bearings at least one runs in helical races, the pitch of which is the same as, or larger or smaller than the pitch of the thread of the lead screw. The friction bearing sleeve has a projection which is arranged with rotary play between a fixed stop and a finely adjustable stop constructed as a micrometer screw.

As a further feature of the invention the nut of the lead screw is movably arranged in the end of the work spindle for instance on needle bearings. It is formed with a projection extending into a longitudinal groove of the bearing box which receives the lead screw bearing. The bearing box is longitudinally movable in the work spindle housing, and, is pressed by springs against the rear wall of its housing. For the direct adjustment of differences in axial position between the grinding disc and the work the bearing box together with the lead screw, work spindle and so on is axially movable by means of a micrometer screw arranged in the work spindle housing through the intermediary of a two-armed lever.

Apparatus constructed in accordance with the invention has the advantage that after rough adjustment has been accomplished whilst the machine is stationary a fine adjustment can be readily effected during the grinding operation, so that a repeated interruption of the running of the machine for long periods is obviated. With respect to other known devices for compensating for the lost motion this device has the further advantage that the direction of feed can be reversed even when the grinding disc is still cutting.

A constructional embodiment of the invention is illustrated by way of example in the accompanying drawing, in which Figure 1 is a sectional view through the work spindle housing with the device for compensating for the play, Figure 2 illustrates schematically the driving mechanism of the work spindle, Figure 3 is a transverse section on the line 3—3 of Figure 1 through the driving member for the work spindle, Figure 4 is a transverse section on the line 4—4 of Figure 1, through the bearing of the lead screw, and Figure 5 is a view of the bearing box of the lead screw.

Referring now to the drawing, the work 3 held between the centers 1 and 2, and on which operates the grinding disc S, receives its forward movement for the particular thread pitch to be produced through direct axial movement of the work spindle 4. This work spindle is arranged in the work spindle housing 5 at the bearing points 6 and 7 so as to be rotatably movable but longitudinally displaceable. The drive of the work spindle is effected through a reversible mechanism. This consists in the embodiment illustrated, of a bevel wheel 8, which is driven by means of a pulley wheel 9 and engages with the bevel wheels 11, 12 which are rotatably mounted on the shaft 10.

According to whether the coupling member 13 engages with the toothed wheel 11 or 12 the direction of rotation of the shaft 10 changes. On this latter is secured the pulley wheel 14, from which, by means of an intermediate member shown as a belt, the rotary movement is transmitted to the pulley wheel 15 mounted on the spindle 4. The pulley wheel 15 is rotatably mounted by means of roller bearings 16 on the spindle 4. It possesses a toothed flange 17, which engages with the toothed wheel 18. The width of the toothed wheel 18 corresponds to the greatest distance through which the work may be fed. The operation of the work spindle 4 by the pulley wheel 15 is brought about by means of a driver member 19, which engages in a segmental recess 20 in a flange 4' of the spindle 4 with a rotary play $x$. The play $x$ corresponds to the maximum play or lost motion arising between the cooperating parts of the mechanism. The toothed wheel 18 on the shaft 21 drives the toothed wheel 26 through gear wheels, 22, 23, 24, 25, and thus causes the lead screw 27 to rotate. Different work pitches are obtained through substituting corresponding sets of gear wheels. The lead screw 27 engages with a nut 28, which is rotatably mounted by bearings 29' in a cavity in the work spindle 4. A projecting part thereof 28' engages with a longitudinal groove 29'', corresponding to the greatest length of feed, of the bearing box 29. The work spindle 4 has a cavity 4'' similarly suited to the greatest length of feed into which the lead screw 27 projects upon the axial movement of the spindle 4. The lead screw 27 is mounted at the rear end of the housing 5 of the work spindle, in a friction bearing sleeve 30. On the bearing sleeve 30 is arranged a sleeve 31, which serves as the inner ring of a two-series ball-bearing. The sleeves 30 and 31 may also be made in one piece. An outer bearing sleeve 32 is rigidly secured to the box 29. The races 31' and 32' of the first set of balls 33 are not, as is usual, concentric grooves, but are in the form of threads, which correspond in direction to the thread of the lead screw 27. That is, if the lead screw 27 has e. g., a right handed thread, then the grooves 31' and 32' also form right handed threads. The pitch of the grooves can be the same as or greater or smaller than the pitch of the thread of the lead screw. The second set of balls 34 runs directly in races formed by cylindrical surfaces of the sleeves 31 and 32. The sleeve 31 has a stop 35, which extends into a recess 32'' in the sleeve 32 and abuts in one direction against the wall 32''' of the recess 32'' and in the other direction against an adjustable screw bolt 36.

The compensation for the play or lost motion between the parts of the mechanism which cooperate to produce the rotary and longitudinal movement of the work spindle 4 takes place, upon reversal of the direction of feed, as follows:

As already mentioned the flange 4' of the work piece spindle 4 has a recess 20, into which the projection 19 of the driving wheel 15 engages. During the feed of the work the projection 20 always abuts against one side or other of the recess 20 in the flange 4'. The play $x$ between the free surface of the projection 19 and the free surface of the recess 20 corresponds to the maximum value of the lost motion occurring within the working range of the machine, or the lost motion between the parts which transmit movement.

The lost motion arising varies with the pitch of the thread of the work, depending on the gear wheels inserted for driving the lead screw.

During the last part of the lost motion $x$ of the pulley wheel 15 the lead screw 27 has already tried to transmit to the work spindle 4 an axial movement, which, however, is prevented by the cooperation for this purpose of the parts 30, 31, 31', 32, 32', 33. The lead screw 27 revolves, as the co-efficient of the rolling friction is smaller than the coefficient of the sliding friction, not in the bearing sleeve 30, but on the sets of ball-bearings 33, 34. The races 31', 32' form a thread having for instance the same pitch as the lead screw thread and which runs in the same direction as the latter. The lead screw 27 has for example a right handed thread and may rotate, after the direction of feed is reversed, in the direction of the arrow $a$. The work spindle 4 will consequently tend to perform an axial movement in the direction of the arrow $b$. At the same time, however, the lead screw 27 since it revolves on the set of balls, 33 in the likewise right handed grooves 31' and 32', performs a longitudinal movement in the direction of the arrow $c$. As the movements $b$ and $c$ are equal but occur in opposite directions, they cancel one another. Therefore in effect no axial movement of the work spindle 4 takes place, until the stop 35 according to the direction of rotation, abuts either against the micrometer bolt 36 or against the stationary surface 32''' of the sleeve 32. Only then will the lead screw rotate again in the bearing sleeve 30 and cause longitudinal movement of the work piece spindle 4. The play due to the space $y$ adjusted by means of the micrometer bolt 36 which the stop 35 must take up upon reversal of the direction of feed, depends on the intermediate gear wheels inserted. It is, when the pitch of the ball races 31' and 32' agrees with that of the thread of the guide spindle, equal to the difference between the greatest possible and the actual existing lost motion.

If the pitch of the ball races 31' and 32' is greater than the pitch of the thread of the lead screw, then, in order that the opposed movements $b$ and $c$ may become equally great and cancel one another, the play due to the space $y$ must be adjusted to an amount which is equal to the difference between the greatest possible and the actual existing lost motion minus the excess of the movement $c$, which is obtained by comparing the pitch of the ball races with the pitch of the thread of the lead screw.

The pitch of the ball races 31' and 32' may also be smaller than that of the thread of the guide spindle. Then the play $y$ is adjusted to an amount which is equal to the difference between the greatest possible and the actual lost motion plus the axial surplus of the movement $b$, which is obtained by comparing the pitch of the thread of the lead screw with that of the ball races.

In this way the compensation for the backlash is always obtained from the amount of the greatest possible lost motion and no alteration occurs in the relative axial location of the grinding tool and work.

The surface 28'' of the nut 28 always abuts against the surface 4''' of the spindle 4. During movement in the one direction the lead screw presses these surfaces against one another, whilst upon movement in the other direction these surfaces abut against one another under the pressure of the tailstock center. Any play in the nut 28, therefore, has no effect in practice. The tailstock chuck 37 which must take part in the axial movement of the work or the work spindle 4, is arranged to be longitudinally movable in the tailstock 38. It is pressed by a spiral volute spring 39 against the work. The volute spring 39 is secured to a bolt 40, and operates over a guide roller 41 on the chuck 37, with which it is connected by means of a screw 42. Instead of the volute spring a weight may also be used, which presses the point of the tailstock against the work.

For the adjustment of differences in position between the work and the grinding disc and the axial adjustment of these relatively to one another the work spindle can be shifted axially together with the work piece. For this purpose the following arrangement serves.

In the work spindle housing 5 a screw threaded spindle 43 is arranged. If the knob 44 thereof is rotated, it advances in threads 45 in the housing 5 and operates on a two-armed lever 46, which engages in an aperture in the case 29 and sleeve 32, and shifts these axially. The case 29 is pressed by springs 47 away from the inner wall 5'' of the bearing housing 5' against the lever 46. If therefore the spindle 43 is suitably rotated, the casing 29 moves backwards under the action of the springs 47. The lead screw 23, work spindle 4 with work and so on, all take part in the axial movement of the casing 29, so that in this way a simple axial adjustment of the work relative to the grinding disc is permitted.

I claim.

1. In a thread cutting machine, a work carrying spindle mounted for rotary and longitudinal movements, means to effect rotary movement of the spindle alternately in opposite directions, a lead screw having operative connection with the spindle to effect longitudinal movement of said spindle, a sleeve wherein said lead screw is frictionally mounted for rotary movement with respect to the sleeve, and anti-friction bearing supporting said sleeve and having spiral races to move the sleeve longitudinally as it is rotated, and gearing connecting the spindle and lead screw to rotate the latter as the spindle is rotated.

2. In a thread cutting machine, a work carrying spindle mounted for rotary and longitudinal movements, means to effect rotary movement of the spindle alternately in opposite directions, a lead screw having operative connection with the spindle to effect longitudinal movement of said spindle, a sleeve wherein said lead screw is frictionally mounted for rotary movement with respect to the sleeve, an anti-friction bearing supporting said sleeve and having spiral races to move the sleeve longitudinally as it is rotated, gearing connecting the spindle and lead screw to rotate the latter as the spindle is rotated, and means to limit rotation of the sleeve in the anti-friction bearing.

3. In a thread cutting machine, a work carrying spindle mounted for rotary and longitudinal movements, means to effect rotary movement of the spindle alternately in opposite directions, a lead screw having operative connection with the spindle to effect longitudinal movement of said spindle, a sleeve wherein said lead screw is frictionally mounted for rotary movement with respect to the sleeve, an anti-friction bearing supporting said sleeve and having spiral races to move the sleeve longitudinally as it is rotated, gearing connecting the spindle and lead screw to rotate the latter as the spindle is rotated, and means to limit rotation of the sleeve in the anti-friction bearing, including a lug on said sleeve and a stop screw in substantially axial alinement with the path of the lug.

4. In a thread cutting machine, a work carrying spindle mounted for rotary and longitudinal movements, means to effect rotary movement of the spindle alternately in opposite directions, a lead screw having operative connection with the spindle to effect longitudinal movement of said spindle, a sleeve wherein said lead screw is frictionally mounted for rotary movement with respect to the sleeve, an anti-friction bearing supporting said sleeve and having spiral races to move the sleeve longitudinally as it is rotated, gearing connecting the spindle and lead screw to rotate the latter as the spindle is rotated, means to limit rotation of the sleeve in the anti-friction bearing, and manually operable means for adjusting said bearing bodily in a longitudinal direction.

5. In a thread cutting machine, a work carrying spindle mounted for rotary and longitudinal movements, means to effect rotary movements of the spindle alternately in opposite directions, a lead screw having operative connection with the spindle to effect longitudinal movement of said spindle, a sleeve wherein said lead screw is frictionally mounted for rotary movement with respect to the sleeve, an anti-friction bearing supporting said sleeve and having spiral races to move the sleeve longitudinally as it is rotated, gearing connecting the spindle and lead screw to rotate the latter as the spindle is rotated, means to limit rotation of the sleeve in the anti-friction bearing, including a lug on said sleeve and a stop screw in substantially axial alinement with the path of the lug, and manually operable means for adjusting said bearing bodily in a longitudinal direction.

HERMANN GODZIEWSKI.